Oct. 30, 1951  C. A. HERRICK  2,573,018
COMBINED FISHHOOK AND LIVE BAIT HOLDER
Filed April 4, 1950
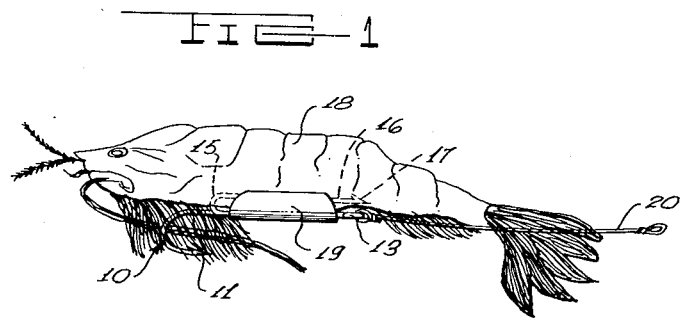
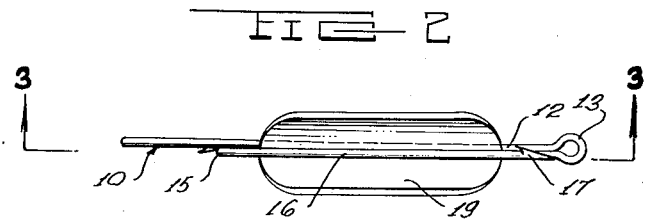
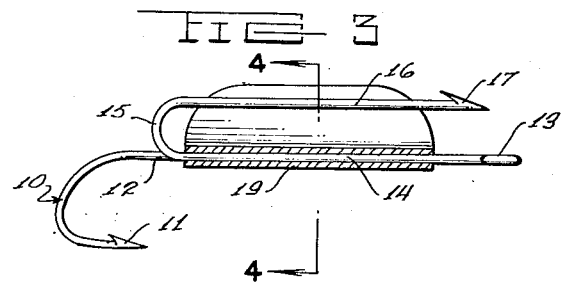
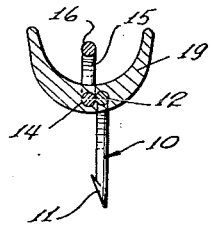
INVENTOR.
CLAUD A. HERRICK
BY
McMorrow, Berman & Davidson
ATTORNEYS Patented Oct. 30, 1951

2,573,018

UNITED STATES PATENT OFFICE 2,573,018

COMBINED FISHHOOK AND LIVE BAIT HOLDER

Claud A. Herrick, Rochester, N. Y.

Application April 4, 1950, Serial No. 153,875

2 Claims. (Cl. 43—44.8)

My invention relates to a combined fishhook and live bait holder.

A primary object of the invention is to provide a combined fishhook and live bait holder which is highly simplified in construction, unitary, and extremely sturdy and durable.

A further object of the invention is to provide a combined fishhook and bait holder including novel means for securing live bait in place upon the holder in such a manner that it will not be crushed or mutilated, the bait, however, being firmly held so that it will not be accidentally displaced from the holder.

A further object is to provide a combined fishhook and bait holder including an integral plug or sinker which is formed in a novel manner to aid in firmly securing the bait to the holder, so that the bait cannot escape during casting, trolling and the like.

A still further object of the invention is to provide a combined device of the above-mentioned character which is neat and attractive in appearance and inexpensive to manufacture.

Other objects and advantages of the invention will be apparent during the course of the following description.

In the accompanying drawings forming a part of this application, and in which like numerals are employed to designate like parts throughout the same:

Figure 1 is a side elevational view of a combined fishhook and live bait holder embodying my invention and illustrating the use of the same;

Figure 2 is a plan view of the combined fishhook and bait holder;

Figure 3 is a central, vertical, longitudinal section taken on line 3—3 of Figure 2; and Figure 4 is a transverse, vertical, sectional view taken on line 4—4 of Figure 3.

In the drawings, where, for the purpose of illustration, is shown a preferred embodiment of my invention, the numeral 10 designates a fishhook including the usual pointed barb 11 and straight, elongated, longitudinal shank portion 12 integral therewith. The end portion of the shank portion 12 remote from the barb 11 is bent upon itself to form a small, substantially circular, closed, line-attaching eye 13 integral therewith, and a second or companion, straight, elongated, longitudinal shank portion 14 arranged adjacent to one side of the shank portion 12 in substantially contacting relation therewith, as shown. The companion shank portion 14 has its end portion remote from the eye 13 upwardly directed or bent to form an integral, substantially U-shaped, lateral extension or end portion 15 integral therewith, and this end portion 15 is disposed substantially in lateral alignment with the tip of the barb 11, Figure 3. As shown in the drawings, the U-shaped end portion 15 and fishhook 10 lie in substantially parallel planes separated laterally by the thickness of the wire forming the fishhook, Figure 4. The line-attaching eye 13, however, is preferably arranged in a plane substantially at right angles to the planes of the fishhook and U-shaped end portion 15.

On the end portion of the lateral, U-shaped end portion 15 remote from the shank portions 12 and 14 is formed a straight, elongated, longitudinal bait-holding or impaling pin or shank portion 16 extending parallel to and spaced laterally from the shank portions 12 and 14, as shown. The bait-holding pin 16 extends for substantially the entire length of the shank portions 12 and 14, and is provided at its free end with a pointed barb 17 serving to prevent the accidental displacement of live bait 18 from the pin. The barb 17 is disposed substantially laterally opposite the eye 13, as shown. The barbs 11 and 17 are pointed in the same direction, and longitudinally spaced as shown, and the fishhook 10 and bait-holding pin 16 lie in parallel planes and are separated laterally only by the thickness of the wire forming the fishhook.

The entire construction thus far described is preferably formed from a single or unitary section of tempered steel wire, or the like. I wish to point out at this time that I contemplate making my combined fishhook and live bait holder in various sizes for catching various types of fish and for holding various types and sizes of live bait.

The companion shank portions 12 and 14 are embedded or molded within the bottom of an elongated, wide, longitudinal, weighted cradle plate or sinker 19, which is generally U-shaped or dished in transverse cross-section and throughout its entire length, as shown. This cradle plate or sinker 19 is preferably formed of solid lead, or the like, and the cradle plate extends equidistantly laterally beyond the opposite sides of the bait-holding pin 16, Figures 2 and 4, the fishhook shank portions 12 being slightly offset laterally from the longitudinal axis of the pin 16 and cradle plate 19, as shown in Figure 4. As best shown in Figures 3 and 4, the upwardly directed or top edges of the U-shaped cradle plate 19 project slightly above the bait-holding pin 16, and the cradle plate 19 preferably extends throughout the major portion of the length of the pin 16.

In use, the fishing line or a catgut or plastic leader 20 is connected with the eye 13 in the usual manner. The live bait 18 is forced onto the bait-holding or impaling pin 16 in the manner shown in Figure 1, with the bottom side of the bait engaging within the U-shaped cradle plate or sinker 19. Since the cradle plate 19 is elongated and extends for substantially the entire length of the pin 16, the maximum area of contact is provided between the bait 18 and cradle plate. This arrangement materially aids in firmly securing the live bait to the bait-holding pin 16, so that it will not be accidentally displaced during casting, trolling or the like. Likewise, the U-shaped cradle plate or sinker 19 coacts with the longitudinal, laterally spaced pin 16 to position the bait in a real or lifelike manner, as the bait is drawn through the water. Since the barb 17 is fully embedded within the bait 18, as shown, it is practically impossible for the bait to disengage the pin 16 and U-shaped cradle plate 19. The extremely firm mounting of the bait upon the holding pin 16 further tends to prevent tearing and mutilation of the bait while it is being drawn through the water, or dragged upon the bottom.

The bait-holding pin 16 is so arranged that the bait may be mounted upon the pin and cradle plate 19 with either the head or tail end of the bait directed forwardly or in the direction of the barbs 11 and 17. It should be noted that the element 19 serves not only as a sinker, cradle or support for the bait 18 and anchoring means for the companion shanks 12 and 14, but also partially conceals the shanks 12 and 14 while substantially completely concealing the pin 16 from the view of the fish. The disposition of the companion shanks 12 and 14 within the bottom of the U-shaped sinker or cradle plate 19 forms a very rigid and strong construction.

It is to be understood that the form of the invention herewith shown and described is to be taken as a preferred example of the same, and that various changes in shape, size and arrangement of parts may be resorted to without departing from the spirit of the invention or the scope of the subjoined claims.

Having thus described my invention, I claim:

1. A unitary combined fishhook and live bait holder comprising a single section of wire bent to form a pair of elongated substantially straight parallel contacting shank portions formed at adjacent end portions to provide an attaching eye, the end portion of one shank portion remote from the eye being bent to form a fishhook extending laterally of the shank portion, the end portion of the other shank portion remote from the eye being bent to form a substantially U-shaped lateral extension projecting laterally beyond the sides of the shank portions remote from the fishhook, said U-shaped lateral extension being bent to form a substantially straight elongated bait-holding pin extending longitudinally of and parallel to the shank portions throughout substantially the entire length of the shank portions, the bait-holding pin being spaced laterally of the shank portions, and a substantially U-shaped elongated weighted cradle plate arranged adjacent to the shank portions and bait-holding pin and having the shank portions embedded therein, the cradle plate extending laterally beyond opposite sides of the shank portions and bait-holding pin, the bait-holding pin being disposed centrally of the U-shaped cradle plate for coaction therewith to firmly secure bait to the pin and cradle plate.

2. A unitary combined fishhook and live bait holder comprising a single section of wire bent to form a pair of elongated substantially straight parallel contacting shank portions formed at adjacent end portions to provide an attaching eye, the end portion of one shank portion remote from the eye being bent to form a fishhook extending laterally of the shank portion, the end portion of the other shank portion remote from the eye being bent to form a substantially U-shaped lateral extension projecting laterally beyond the sides of the shank portions remote from the shank hook, said U shaped lateral extension being bent to form a substantially straight elongated bait holding pin extending longitudinally of and parallel to the shank portions throughout substantially the entire length of the shank portions, the bait holding pin being spaced laterally of the shank portions, and a substantially U shaped elongated weighted cradle plate arranged adjacent to the shank portions and bait holding pin and having the shank portions embedded therein.

CLAUD A. HERRICK.

REFERENCES CITED

The following references are of record in the file of this patent:

UNITED STATES PATENTS

| Number | Name | Date |
|---|---|---|
| 422,226 | Kestner | Feb. 25, 1890 |
| 1,246,150 | Parr | Nov. 13, 1917 |
| 2,330,517 | Rigandi | Sept. 28, 1943 |